United States Patent
Mutoh et al.

(10) Patent No.: US 7,605,853 B2
(45) Date of Patent: Oct. 20, 2009

(54) SOLID-STATE IMAGE SENSING DEVICE AND CAMERA

(75) Inventors: Nobuhiko Mutoh, Suita (JP); Sei Suzuki, Takatsuki (JP)

(73) Assignee: Panasonic Corporation, Osaka (JP)

( * ) Notice: Subject to any disclaimer, the term of this patent is extended or adjusted under 35 U.S.C. 154(b) by 596 days.

(21) Appl. No.: 11/127,116

(22) Filed: May 12, 2005

(65) Prior Publication Data
US 2005/0285957 A1  Dec. 29, 2005

(30) Foreign Application Priority Data
Jun. 22, 2004 (JP) ............... 2004-183540
Jan. 28, 2005 (JP) ............... 2005-022203

(51) Int. Cl.
*H04N 3/14* (2006.01)
*H04N 5/335* (2006.01)

(52) U.S. Cl. .................................... 348/300

(58) Field of Classification Search ........... 348/301, 348/308, 300; 330/277, 310
See application file for complete search history.

(56) References Cited

U.S. PATENT DOCUMENTS 5,144,447 A * 9/1992 Akimoto et al. ........... 348/301
6,437,635 B1   8/2002 Watanabe
7,212,241 B2 * 5/2007 Iesaka .................... 348/320
2002/0003964 A1 * 1/2002 Kanbara et al. .......... 396/661
2003/0011698 A1 * 1/2003 Iesaka .................... 348/324
2003/0200071 A1 * 10/2003 Zhang et al. ............ 703/15

FOREIGN PATENT DOCUMENTS

JP  6-232656  8/1994
JP  2000-278608  10/2000

OTHER PUBLICATIONS

T. Ando and H. Komobuchi, "*Basis Of Solid-State Image Sensing Device*", Japan Science Publishing Association, 1999, p. 79.

* cited by examiner

*Primary Examiner*—Jason Chan
*Assistant Examiner*—Leslie Virany
(74) *Attorney, Agent, or Firm*—Wenderoth, Lind & Ponack, L.L.P.

(57) ABSTRACT

A solid-state imaging device includes a source-follower amplifier having a driver transistor and a load circuit connected to the driver transistor. The load circuit is structured by a first MOS transistor having a gate with a fixed potential, and a load device connected to a source of the first MOS transistor. Furthermore, the load circuit of the source-follower amplifier is structured by a plurality of serially connected MOS transistors. Furthermore, by adapting a structure using a current mirror circuit, load conductance is reduced.

8 Claims, 13 Drawing Sheets

SOLID-STATE IMAGE SENSING DEVICE AND CAMERA

BACKGROUND OF THE INVENTION (1) Field of the Invention

The present invention relates to a solid-state image sensing device and a camera, having a source-follower amplifier, and particularly relates to improvement of an output amplifier that converts signal charge generated by a photoelectric conversion unit into voltage and outputs the converted voltage.

(2) Description of the Related Art

Taking a charge coupled device (CCD) type solid state imaging device as an example, a solid state imaging device includes a photoelectric conversion unit, a charge transfer unit, and an output amplifier which converts signal charge into voltage signal, then amplifies and outputs the voltage signal. A floating diffusion amplifier is widely used as an output amplifier. The floating diffusion amplifier is structured by a floating diffusion layer which functions as a charge detection capacitor for converting signal charge to voltage, and a source-follower amplifier which is connected to the floating diffusion layer. In order to realize high output voltage and high signal-to-noise (SN) ratio in a solid-state image sensing device, further improvement of gain in the output amplifier is required.

FIG. 1 shows a circuit which is widely known for the conventional output amplifier technology. As shown in the diagram, the output amplifier is a 3-stage, source-follower amplifier, and each stage is structured by one metal-oxide semiconductor (MOS) type driver transistor and one MOS-type load transistor (for example, see: T. Ando, H. Komobuchi, "Basis of Solid-state Image Sensing Device", Japan Science Publishing Association, 1999, p. 79). Furthermore, FIG. 2 shows the application of a current mirror circuit as an output circuit of an amplification-type solid state imaging apparatus disclosed in Japanese Laid-Open Patent Application No. 2000-278608 Publication. In addition, a semiconductor apparatus having a cascode FET in the output buffer (Japanese Laid-Open Patent Application No. 06-232656 Publication) is also widely known.

The following formula gives the small-signal voltage gain "G" of a source-follower amplifier:

$$G = gm/(gm+gds+gmb+gl) \quad \text{(Formula 1)}$$

Here, "gm" is the mutual conductance of the driver transistor, "gds" is the drain conductance of the driver transistor, "gmb" is the backgate conductance of the driver transistor, and "gl" is the conductance of the load circuit.

Although the load circuit conductance gl serves as the drain conductance of the load transistor in the conventional output amplifier, it cannot be adequately reduced in comparison with the mutual conductance of the driver transistor gm, and is one cause for the deterioration of the small-signal voltage gain G. In particular, as there are many cases where the power source voltage of the output amplifier is set in common with the voltage of the charge reading pulse from a photodiode to the CCD, and a relatively high voltage of 10 to 15V is set in the CCD-type solid state imaging device, a high voltage of about 10V is also applied between the source and drain of the load transistor, and reduction of drain conductance is difficult.

Furthermore, when the source-drain voltage of the load transistor becomes a high voltage, there is a possibility of a hot-carrier being generated from the increase in the electrical field in the vicinity of the drain within the channel of the load transistor, and the problem of light emission can occur in connection with the impact ionization of the carrier. When a light ray of the emitted light reaches the imaging unit of the imaging device, it becomes a false signal of the output signal from the imaging device, and causes the deterioration of imaging characteristics.

SUMMARY OF THE INVENTION

The present invention is conceived to solve the aforementioned problems existing in the conventional technology and has as an objective to provide a solid-state imaging device which includes a source-follower amplifier that can realize a high gain by restraining a conductance "gl" of a load circuit, and prevent the deterioration of imaging characteristics resulting from the generation of a hot-carrier.

In order to solve the aforementioned issues, the solid-state imaging device in the present invention is a solid-state imaging device comprising a source-follower amplifier having a driver transistor and a load circuit which is connected to the driver transistor, wherein the load circuit includes: a first metal-oxide semiconductor (MOS) transistor having a gate with a fixed potential, and a load device which is connected to a source of the first MOS transistor.

According to this structure, the load circuit of the source follower-amplifier is structured by the first MOS transistor and the load device. Therefore, gain can be improved through the reduction of the source-drain voltage of the first MOS transistor and restraining of the conductance gl of the load circuit.

Furthermore, as the source-drain voltage of the first MOS transistor is reduced, the electric field in the vicinity of the drain of the first MOS transistor is weakened, light emission resulting from the generation of a hot-carrier can be precluded, and deterioration of imaging characteristics can be prevented.

Furthermore, through the effect of the load device, it is possible to restrain the current fluctuation with respect to the voltage fluctuation of the constant voltage applied to the gate of the first MOS transistor.

Here, it is possible to have a structure wherein the load device is a resistive element.

Here, it is possible to have a structure wherein the load device includes a second MOS transistor.

Here, it is possible to have a structure wherein the source of the first MOS transistor is connected to a drain of the second MOS transistor.

Here, it is possible to have a structure wherein the source of the first MOS transistor is connected to a source and the drain of the second MOS transistor.

Here, it is possible to have a structure wherein a gate of the second MOS transistor has a fixed potential.

Here, it is possible to have a structure wherein the solid-state imaging device comprises cascade-connected source-follower amplifiers arranged in stages, including the source-follower amplifier.

Here, it is possible to have a structure wherein the load device includes a plurality of serially connected MOS transistors each of which has a drain and a source, the drain of one of the MOS transistors preceding in the serial connection being connected to the source of another of the MOS transistors immediately following in the serial connection.

Here, it is possible to have a structure wherein each of the serially connected MOS transistors has one of i) a gate connected to the drain, and ii) a gate with a fixed potential.

According to the aforementioned structure, there are cases where the load device is structured by a resistive element made from polysilicon or the like, and cases where it is structured using a MOS transistor channel resistor. As the sheet resistance value of a resistive element made from polysilicon or the like, is generally lower than the sheet resistance value of a MOS transistor channel resistor, (in the case where the current flowing in the source-follower amplifier is a relatively large current and a relatively low resistance value is required for the load device), structuring with a resistive element allows the area to be occupied within the device to be made smaller. On the other hand, in the case where the current flowing in the source-follower amplifier is a small current and a relatively large resistance value is required for the load device, a structure using a MOS transistor has an advantage of enabling the area to be occupied within the device to be made smaller.

Furthermore, by adopting a structure where the gate and the drain of a MOS transistor are connected, in the structuring of the load circuit using a MOS transistor channel resistor, it is possible to obtain a characteristic in which the relationship between the voltage applied between the source and drain, and the drain current are roughly proportional, and a voltage source for generating the voltage to be applied to a gate is not necessary. On the other hand, although a voltage source for generating the voltage to be applied to a gate is necessary when a predetermined voltage is applied to the gate of a MOS transistor, as the point of operation can be set in the saturation region of the MOS transistor, it is possible to further reduce the conductance of the load circuit as a whole, and a further improvement of gain is possible.

Here, it is possible to have a structure wherein a gate length of a MOS transistor other than said first MOS transistor is greater than a gate length of said first MOS transistor.

According to this structure, by lengthening the gate length of MOS transistors other than the first MOS transistor and increasing the channel resistance of the other MOS transistors, the source-drain voltage of the first MOS transistor can be further reduced, and the conductance gl of the load circuit can be further restrained.

Here, it is possible to have a structure wherein a threshold voltage of a MOS transistor other than said first MOS transistor is higher than a threshold voltage of said first MOS transistor.

Here, it is possible to have a structure wherein a gate dielectric film thickness of a MOS transistor other than said first MOS transistor is greater than a gate dielectric film thickness of said first MOS transistor.

According to this structure, by thickening the gate dielectric film thickness of the MOS transistors other than the first MOS transistor, or increasing the threshold voltage of the other MOS transistors through other means, the source-drain voltage of the first MOS transistor can be further reduced, and the conductance gl of the load circuit can be further restrained.

Here, it is possible to have a structure wherein a gate length, a threshold voltage, and a gate dielectric film thickness of a MOS transistor other than said first MOS transistor are respectively equal to a gate length, a threshold voltage, and a gate dielectric film thickness of said first MOS transistor.

According to this structure, the characteristics of the first MOS transistor and the MOS transistors other than the first MOS transistor become equal, making designing easy.

Here, it is possible to have a structure wherein a channel width of said first MOS transistor and a channel width of a MOS transistor connected to the source of said first MOS transistor are equal.

According to this structure, by making the channel width of the plurality of serially connected MOS transistors approximately equal, there is an advantage of enabling easy design modification under constant channel current density, when the channel widths of the plurality of MOS transistors are modified in the same ratio during design modifications for a change in current value. The serially connected MOS transistors can be considered as unit modules, and it is possible to obtain a desired current by modifying the number of such unit modules to be parallelly connected. In this case, designing is made easier as it is possible to respond through modification of the wiring process.

Here, it is possible to have a structure wherein the load circuit makes up a current mirror circuit which includes a plurality of serially connected MOS transistors each of which has a drain and a source, the drain of one of the MOS transistors preceding in the serial connection being connected to the source of another of the MOS transistors immediately following in the serial connection.

Here, the current mirror circuit can be a cascode-type current mirror.

Here, it is possible to have a structure wherein a MOS transistor and a corresponding MOS transistor in the current mirror circuit have a same channel length, the MOS transistor having a gate connected to a gate of the corresponding MOS transistor.

Here, it is possible to have a structure wherein the serially connected MOS transistors included in the current mirror circuit have substantially equal channel widths.

According to this structure, by having a load circuit that is a current mirror circuit and structuring the part along the current path connected to the driver transistor from the plurality of serially connected MOS transistor, as in a Wilson current mirror circuit, cascode current mirror circuit, and the like, the conductance gl of the load circuit can be further restrained and gain can be improved.

Here, it is possible to have a structure wherein the cascode-type current mirror circuit includes: a first MOS transistor group having a plurality of MOS transistors that are serially connected to a source of said driver transistor, and a second MOS transistor group made up of a plurality of serially connected MOS transistors, which generates and supplies a plurality of reference potentials to respective gates of the MOS transistors of the first MOS transistor group, the plurality of reference potentials being generated by a predetermined current running through the serially connected MOS transistors of the second MOS transistor group, and at least one MOS transistor, which is not connected to the first MOS transistor group, is connected between two MOS transistors within the second MOS transistor group, corresponding to two of the serially connected MOS transistors within the first transistor group, the corresponding MOS transistors having respective gates which are connected to each other, and the two serially connected MOS transistors being in a drain-to-source serial connection with each other.

According to this structure, as a plurality of stages are adopted for the number of stages of the cascode current mirror circuit, a further reduction of load conductance can be made possible. In addition, deterioration of imaging characteristics resulting from the generation of a hot-carrier can be further prevented.

Furthermore, the camera in the present invention likewise includes the same structure as in the solid-state imaging device described above.

As described above, according to the solid-state imaging device in the present invention, improvement of gain is made possible, light emission resulting from the generation of a hot-carrier can be precluded, and deterioration of imaging characteristics can be prevented, through the restraint of the conductance gl of the load circuit.

Furthermore, by structuring the load device, which is a component of the load circuit, from a resistive element or a MOS transistor, as appropriate, the area occupied within the device can be made smaller.

Furthermore, by increasing the threshold voltage by lengthening the gate length or thickening the gate dielectric film thickness of the MOS transistors making up the load device, or the like, further gain improvement is possible and prevention of imaging characteristic deterioration becomes easier.

Furthermore, by making the channel widths of the plurality of serially connected MOS transistors in the load circuit approximately equal, design modification with respect to a change in current value becomes easy.

In addition, by having a load circuit that is a current mirror circuit and structuring the part along the current path connected to the driver transistor, from the plurality of serially connected MOS transistors, further improvement of gain is made possible.

FURTHER INFORMATION ABOUT TECHNICAL BACKGROUND TO THIS APPLICATION

The disclosure of Japanese Patent Application No. 2004-183540 filed on Jun. 22, 2004, and Japanese Patent Application No. 2005-022203 filed on Jan. 28, 2005, including respective specifications, drawings and claims are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the Drawings.

DETAILED DESCRIPTION OF THE INVENTION

Hereinafter, the solid-state imaging device in an embodiment of the present invention shall be explained with reference to the diagrams.

Although in all the embodiments explained hereinafter, all MOS transistors making up a source-follower amplifier are N-type MOS transistors, substitution with P-type MOS transistors is also possible.

Figure 1:
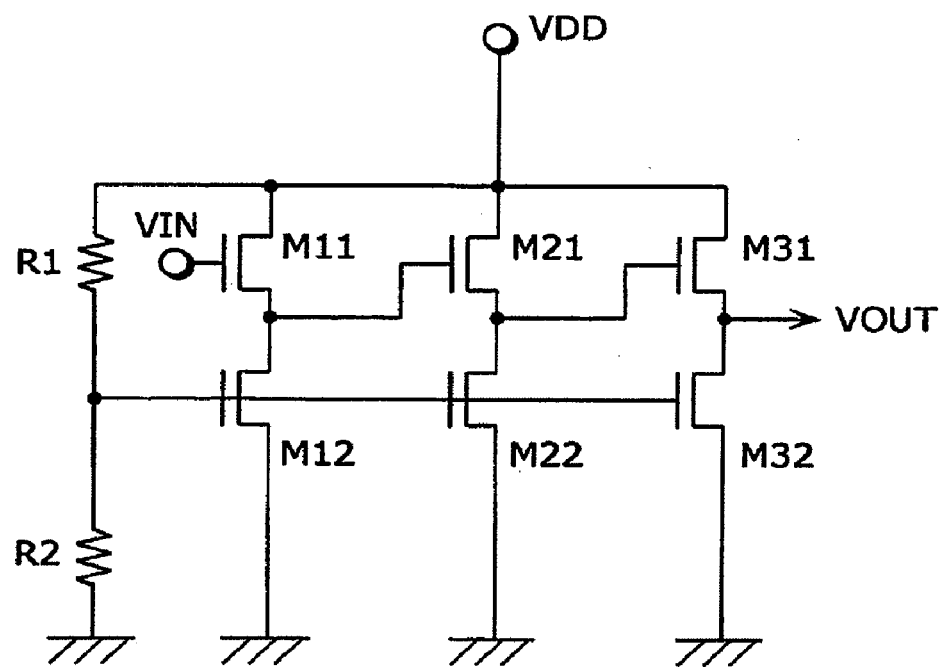
FIG. 1 is a circuit diagram of the conventional solid-state imaging device.
Figure 2:
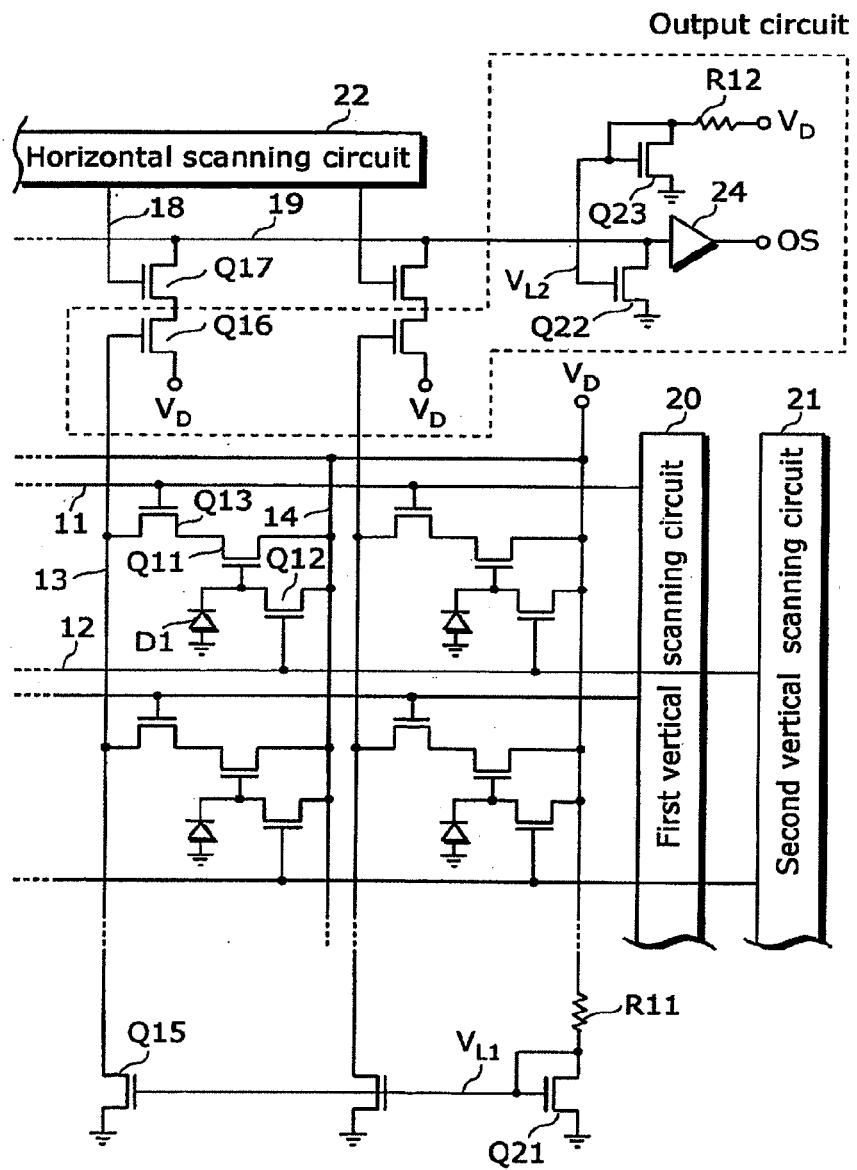
FIG. 2 is a diagram of the application of a current mirror circuit as the output circuit of an amplification-type solid state imaging device.
Figure 3:
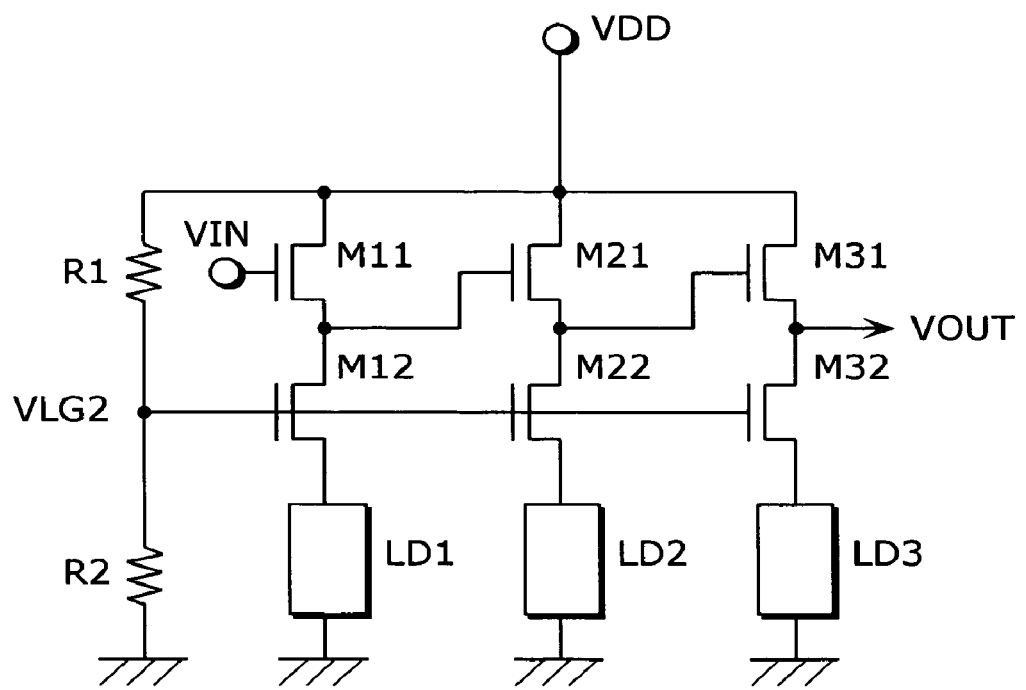
FIG. 3 is a circuit diagram of the output amplifier included in the solid-state imaging device in the first embodiment.

FIG. 3 is a circuit diagram of an output amplifier included in the solid-state imaging device in the first embodiment of the present invention. The output amplifier is structured by a three-stage cascade connection of source-follower amplifiers. Needless to say, a single-stage structure or a structure having a different number of cascade connection stages is also possible. The output amplifier is a component of the solid-state imaging device, and is a floating diffusion amplifier. A gate input VIN of a first-stage driver transistor M11 is connected to a floating diffusion layer which functions as a charge detection capacitor for converting signal charge to voltage. Furthermore, the output of the third stage is outputted to the outside of the device.

In FIG. 3, a load circuit of the first-stage source-follower amplifier is structured by a first MOS transistor M12 having a gate fixed to a potential VLG2, and a load device LD1 connected to the source of the first MOS transistor M12. In the present embodiment, the potential VLG2 is generated through voltage division of the power source voltage VDD by a resistor R1 and a resistor R2. It is also possible to assume a structure in which the potential VLG2 is not a fixed potential generated by voltage division, but instead being applied from outside the device, allowing the potential to be changed depending on the requirement.

The second-stage source-follower amplifier is also structured by a MOS transistor M22 having a gate likewise fixed to the potential VLG2, and a load device LD2 which is connected to the source of the MOS transistor M22. The third-stage source-follower amplifier is also structured by a MOS transistor M32 having a gate likewise fixed to the potential VLG2, and a load device LD3 which is connected to the MOS transistor M32.

In the present embodiment, the channel length of the MOS transistors M12, M22, and M32 is about 10 to 20 μm, with the channel width being about 10 to 20 μm for the first-stage M12, about 30 to 100 μm for the second-stage M22, and about 200 to 500 μm for the third-stage M32. With regard to voltage settings in the operational state, the power source voltage VDD is 12V, the gate potential of the driver transistor M11 connected to the floating diffusion layer is about 11V, and the voltage VLG2 applied to the gate of the MOS transistors M12, M22, and M32 is about 3 to 6 volts. At this time, the source potential of the MOS transistors M12, M22, and M32 is about 2 to 4 volts, and the source-drain voltage of the MOS transistors M12, M22, and M32 is 3 to 8V. In the case of the conventional single transistor structure, the source-drain voltage is 7 to 10V. As the source-drain voltage is reduced in comparison to the latter, the drain conductance of the MOS transistor is reduced to about $\frac{1}{10}^{th}$, and the gain of the source-follower amplifier is improved by about 3 to 5 percent.

Furthermore, as the source-drain voltage of the MOS transistor M12 is reduced, the electric field in the vicinity of the drain is weakened, occurrence of light emission resulting from the generation of a hot-carrier can be precluded, and the deterioration of imaging characteristics can be prevented.

Furthermore, through the effect of the load device LD1, it is possible to restrain the current fluctuation with respect to the voltage fluctuation of the constant voltage VLG2 applied to the gate of the first MOS transistor.

A current of about 10 μA/μm of the channel width flows in the source-follower amplifiers in each stage. In other words, a current of about 100 to 200 μA flows in the first stage, 300 μA to 1 mA in the second stage, and about 2 to 5 mA in the third stage.

In the case where the load devices LD1, LD2, and LD3 are structured by a resistive element, the resistance value of LD1, LD2, and LD3 is a few tens of kΩ, a few kΩ to 10 kΩ, and a few hundred Ω to a few kΩ, respectively. When these resistive elements are formed from a polysilicon resistor with a sheet resistance of 50Ω and line width of 2 μm, a line length of about a few hundred μm for LD1, a line length of about 100 μm for LD2, and a line length of about 10 μm for LD3 becomes necessary. In particular, the area within the device needed for the formation of the polysilicon resistor for LD1 increases.

As the load devices LD1, LD2, and LD3 in the respective stages of the cascade connected three stages are provided separately in the present embodiment, there is an advantage of being able to optimally design the resistance values of the load devices LD1, LD2, and LD3 on a per-stage basis.

Figure 4:
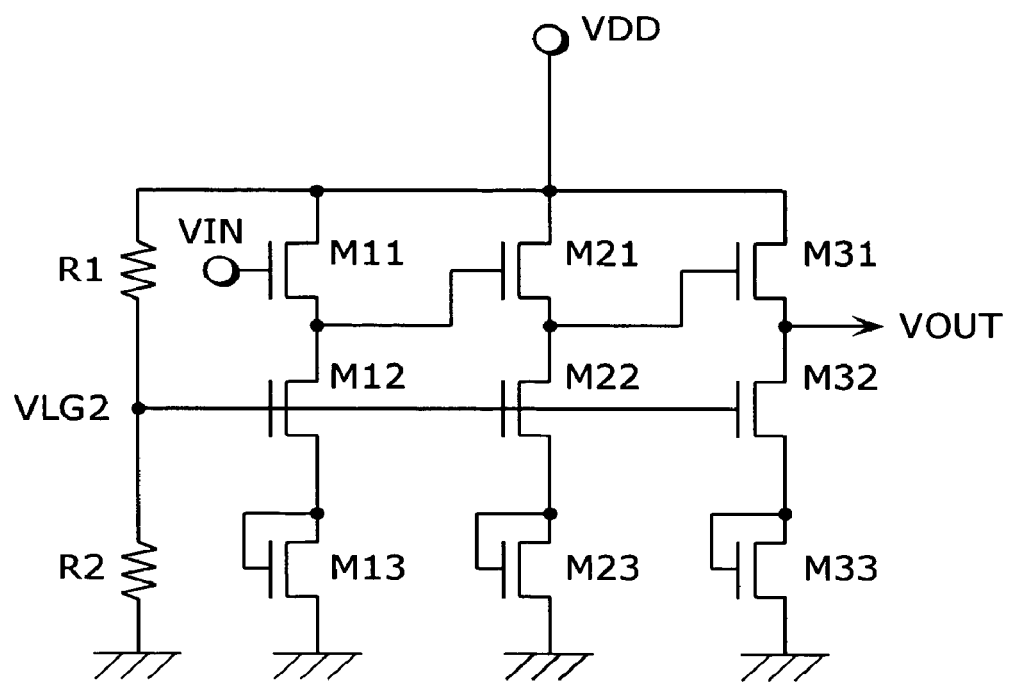
FIG. 4 is a circuit diagram of the output amplifier included in the solid-state imaging device in the second embodiment.

FIG. 4 is a circuit diagram of the output amplifier included in the solid-state imaging device in the second embodiment of the present invention. The difference with the first embodiment lies in the point where the load circuit of the source-follower amplifier is structured by two MOS transistors which are serially connected. In other words, the load circuit of the first-stage source-follower amplifier is structured by MOS transistors M12 and M13. The load circuit of the second-stage source-follower amplifier is structured by MOS transistors M22 and M23. The load circuit of the third-stage source-follower amplifier is structured by MOS transistors M32 and M33. The MOS transistors M13, M23, and M33 correspond, respectively, to the load devices LD1, LD2, and LD3 in the respective stages in FIG. 3. Furthermore, the gate and drain are connected in each of the MOS transistors M13, M23, and M33.

In the present embodiment, the channel length of the MOS transistors M12, M22, M32, M13, M23, and M33 is about 10 to 20 μm, and the channel width is about 10 to 20 μm for M12 and M13 in the first stage, 30 to 100 μm for M22 and M23 in the second stage, and about 200 to 500 μm for M32 and M33 in the third stage.

The voltage setting and current value in the operational state is approximately the same as in the first embodiment, and the effect of gain improvement, the effect of preventing imaging characteristic deterioration, and the effect of restraining current fluctuation, are approximately the same as in the first embodiment.

In addition, compared with the first embodiment, the current in the second embodiment is relatively small, and the area occupied within the device is smaller in relation to LD1 which, as a load device, requires a relatively high resistance value.

Figure 5:
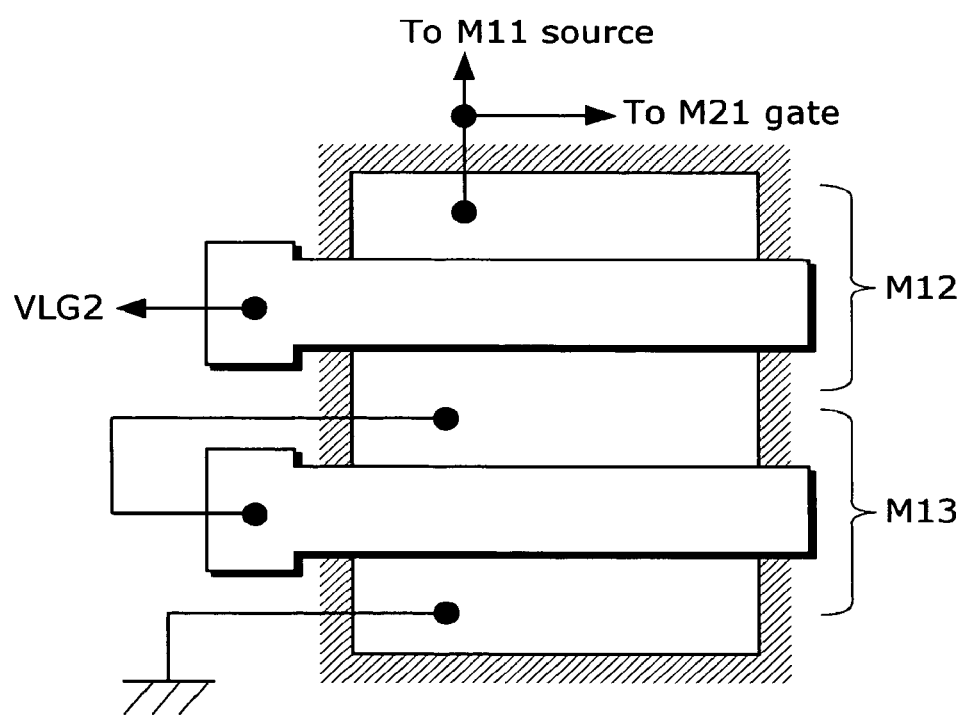
FIG. 5 is a planar view of the MOS transistors M12 and M13.

FIG. 5 is a planar view of the two MOS transistors M12 and M13 making up the load circuit of the first-stage source-follower amplifier in FIG. 4. In the diagram, the channel width is shown in the vertical direction and channel length is in the horizontal direction. The source diffusion layer of the MOS transistor M12 and the drain diffusion layer of the MOS transistor M13 have a common structure, and the channel width of M12 and M13 have the same design. The channel width of the two MOS transistors M22 and M23 making up the load circuit of the second-stage source-follower amplifier, and the channel width of the two MOS transistors M32 and M33 making up the load circuit of the third-stage source-follower amplifier can each have the same design as in FIG. 5. By modifying channel width in the same ratio during a design modification for a change in current value, there is an advantage of enabling easy design modification under constant channel current density.

Figure 6:
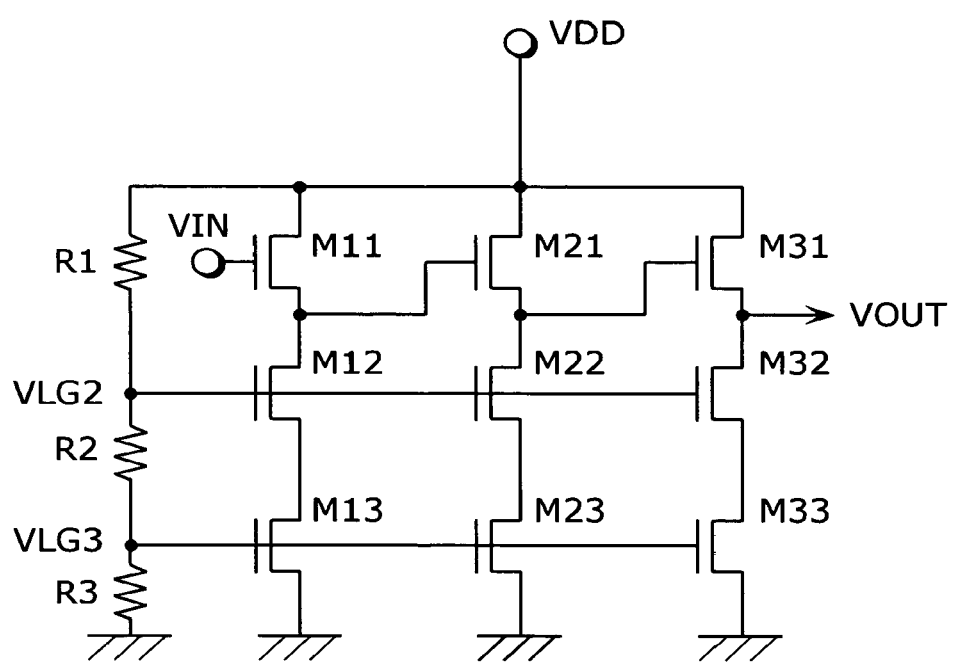
FIG. 6 is a circuit diagram of the output amplifier included in the solid-state imaging device in the third embodiment.

FIG. 6 is a circuit diagram of the output amplifier included in the solid-state imaging device in the third embodiment of the present invention. The difference with the second embodiment lies in the point where the respective gates of MOS transistors M13, M23, and M33, are connected to a potential VLG3 which is generated through voltage division.

Apart from VLG3, the voltage settings and current values in the operational state is approximately the same as in the second embodiment. However, as the gates of MOS transistors M13, M23, and M33 are fixed to VLG3, load conductance is further reduced, and in addition, gain is improved. Aside from that of gain, the effect of preventing imaging characteristic deterioration, and the effect of restraining current fluctuation, are approximately the same as in the second embodiment.

By increasing channel resistance by making the gate lengths of the MOS transistors M13, M23, and M33 longer than the gate lengths of the MOS transistors M12, M22, and M32 in the second and third embodiments described above, voltage drop in the MOS transistors M13, M23, and M33 is increased, the source-drain voltage of the MOS transistors M12, M22, and M32 is further reduced, and the conductance gl of the load circuit can be further restrained.

Furthermore, by increasing the threshold voltage by making the gate dielectric film thicknesses of the MOS transistors M13, M23, and M33 thicker than the gate dielectric film thicknesses of the MOS transistors M12, M22, and M32, voltage drop in the MOS transistors M13, M23, and M33 is increased, the source-drain voltage of the MOS transistors M12, M22, and M32 is further reduced, and the conductance gl of the load circuit can be further restrained. In the CCD-type solid-state imaging device, an oxide film-nitride film-oxide film (ONO structure) is widely used for the gate dielectric film in a CCD transfer electrode, and an oxide film is widely used for the gate dielectric film in the driver transistor of the output amplifier. In general, the thickness of the gate dielectric film in the transfer electrode is greater than the thickness of the gate dielectric film in the driver transistor of the output amplifier. Accordingly, the output amplifier can be easily implemented, by using the same oxide film as in the gate dielectric film in the driver transistor of the output amplifier, in the gate dielectric film in the gate dielectric film of the MOS transistors M12, M22, and M32, and by assuming the same ONO structure in the CCD transfer electrode, for the gate dielectric film of the MOS transistors M13, M23, and M33.

Figure 7:
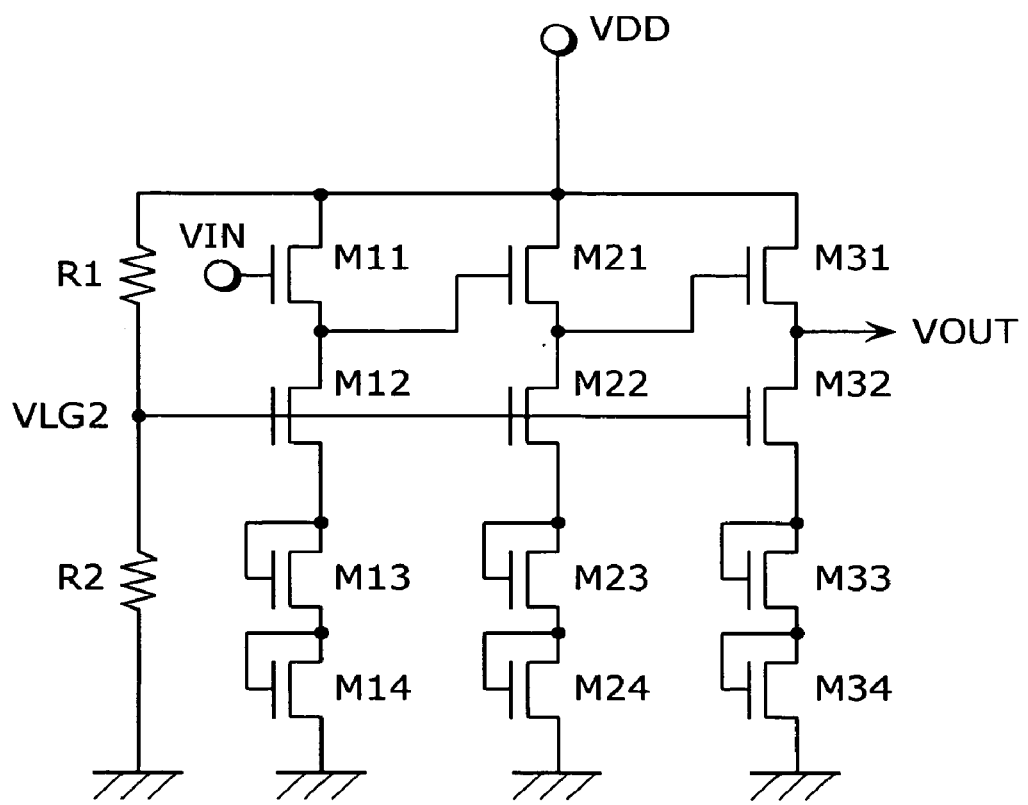
FIG. 7 is a circuit diagram of the output amplifier included in the solid-state imaging device in the fourth embodiment.

FIG. 7 is a circuit diagram of the output amplifier included in the solid-state imaging device in the fourth embodiment of the present invention. Although, in the previously described second and third embodiments, the number of MOS transistors making up the load device is one each for every stage, in the embodiment shown in FIG. 7, the number of MOS transistors making up the load device is two for each stage. By increasing this number, the source-drain voltage of the MOS transistor which functions as a current source can be further reduced, and the conductance gl of the load circuit can be further restrained.

Figure 8:
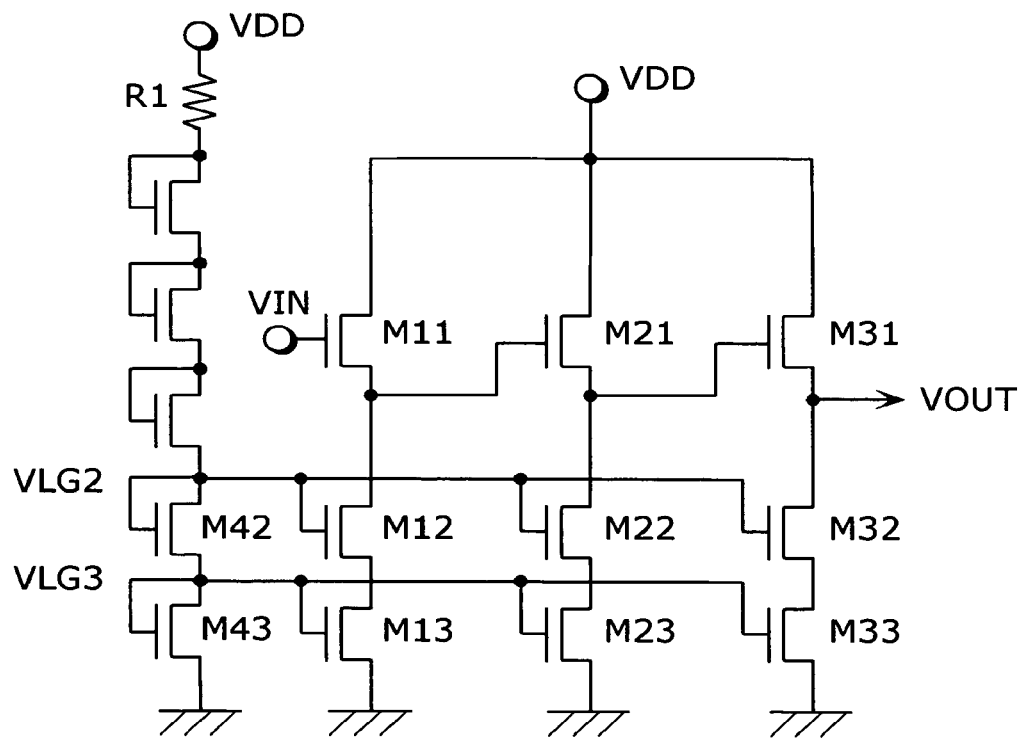
FIG. 8 is a circuit diagram of the output amplifier included in the solid-state imaging device in the fifth embodiment.

FIG. 8 is a circuit diagram of the output amplifier included in the solid-state imaging device in the fifth embodiment of the present invention. The difference with the embodiment shown in FIG. 6 lies in the point in which MOS transistors M42 and M43 are provided for generating the potentials VLG2 and VLG3, and make up a cascode current mirror circuit. In other words, the gate and drain of the MOS transistor M42 are connected to each other, and in addition, connected to the gates of the MOS transistors M12, M22, and M32. Furthermore, the gate and drain of the MOS transistor M43 are connected to each other, and in addition, connected to the gates of the MOS transistors M13, M23, and M33. MOS transistors and a resistor R1 for regulating a reference current which is common to the MOS transistors M42 and M43 are provided in between the drain of the MOS transistor M42 and a power source VDD. It is also possible to have only a resistor or only a MOS transistor as the device provided between M42 and the power source.

In addition, in the present embodiment, the structure and channel lengths of the four transistors, namely the MOS transistors M12, M22, M32, and M42, serving as the load of the source-follower amplifier have the same design, and the structure and channel lengths for the four transistors, namely the MOS transistors M13, M23, M33, and M43 have the same design. Furthermore, M42 and M43 have approximately equal channel widths. With this, the ratio of the reference current and the current flowing in the source-follower amplifier of each stage is determined by the ratio of the channel widths of the aforementioned MOS transistors.

Taking the first stage as an example, and assuming the drain conductance of the MOS transistor M12 at operating point to be "gds12", the mutual conductance to be "gm12", and the drain conductance of M13 to be "gds13", the load conductance of the first-stage current source is given in the subsequent formula.

$$gl = gds12 \times gds13 / gm12$$

As the load conductance in the circuit of the conventional solid-state imaging device is "gl=gds12", by application, the load conductance is multiplied "(gds13/gm12) times". In general, it is easy to design gds13 to be about one-tenth or less of gm12, and a further reduction of the load conductance is made possible.

Figure 9:
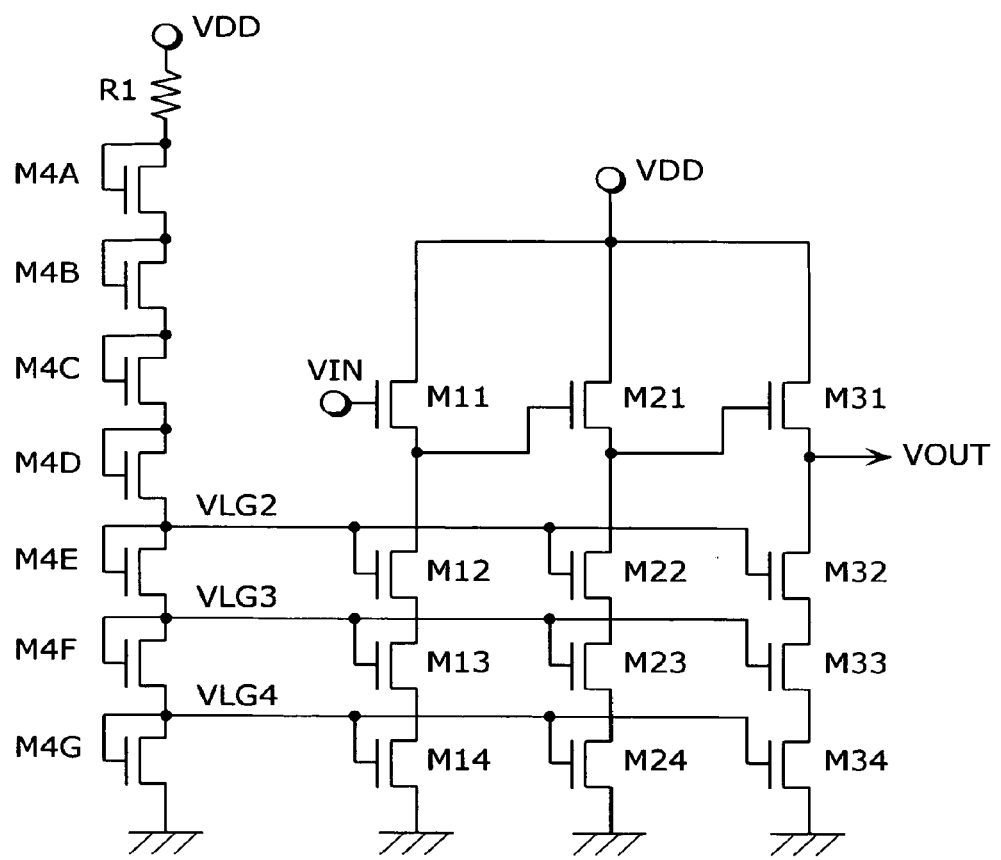
FIG. 9 is a circuit diagram of the output amplifier included in the solid-state imaging device in the sixth embodiment.
Figure 10:
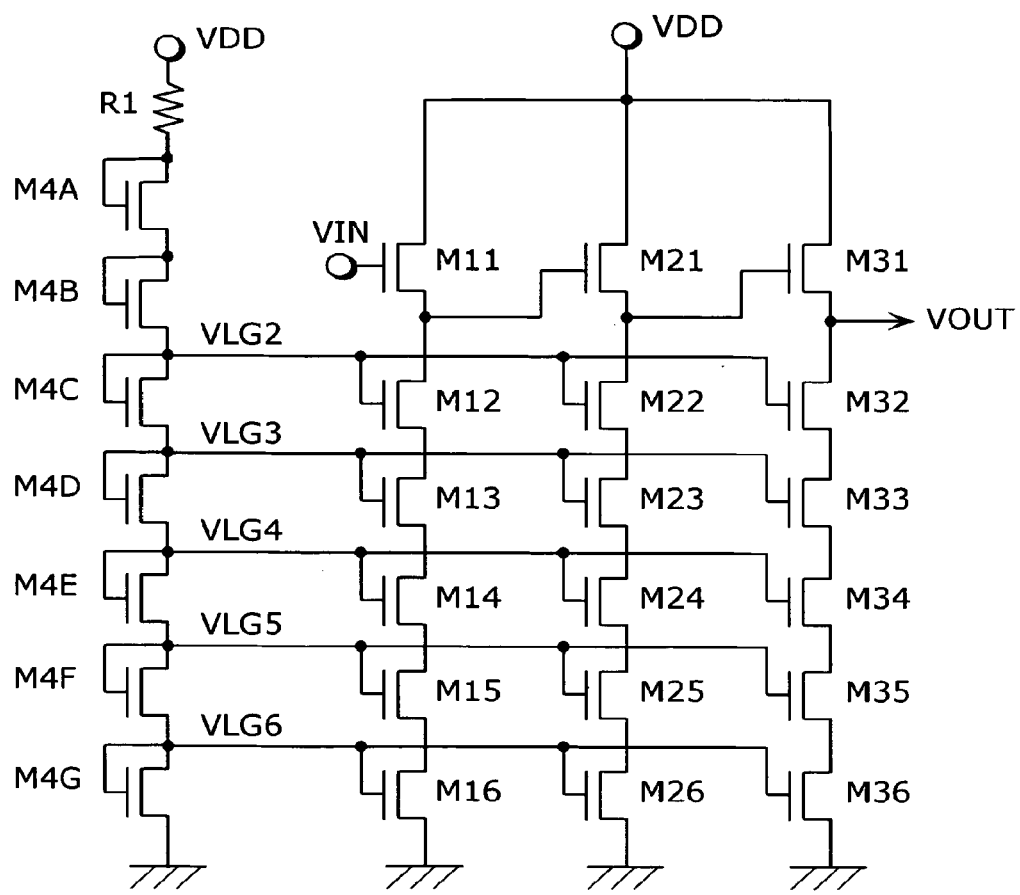
FIG. 10 is a circuit diagram of the output amplifier included in the solid-state imaging device in the seventh embodiment.

FIG. 9 and FIG. 10 are circuit diagrams of the output amplifier included in the solid-state imaging device in the sixth and seventh embodiments of the present invention, respectively. In contrast to the basic cascode current mirror circuit applied in the embodiment shown in FIG. 8, the present embodiments utilize a three-stage and a five-stage cascode current mirror circuit, respectively. The primary advantage in increasing the number of stages in a cascode current mirror circuit is that as the number of stages increases, further reductions of the load conductance are made possible.

Another point is that deterioration of imaging characteristics resulting from the generation of a hot-carrier can be further prevented. In FIG. 9 and FIG. 10, MOS transistor group M4A, M4B, M4C, M4D, M4E, M4F, and M4G which are serially connected along the current path regulating the reference current, all bear the same structure. When the power source voltage VDD is 12 volts, the voltage drop in each of such transistors is set at approximately 1.5V. Accordingly, in FIG. 9, the source potential of the transistors M12, M22, and M32 is set at approximately 3V, and as a result, the source-drain voltage of M12, M22, and M32 is about 5 to 7V. At the same time, in FIG. 10, the source potential of the transistors M12, M22, and M32 is set at approximately 6V, and as a result, the source-drain voltage of M12, M22, and M32 is about 2 to 4V. In other words, as the number of stages is increased, the source-drain voltage is reduced, and as the electric field in the vicinity of the drain is weakened, occurrence of a light emission resulting from the generation of a hot-carrier can be precluded, and the deterioration of imaging characteristics can be prevented.

Figure 11:
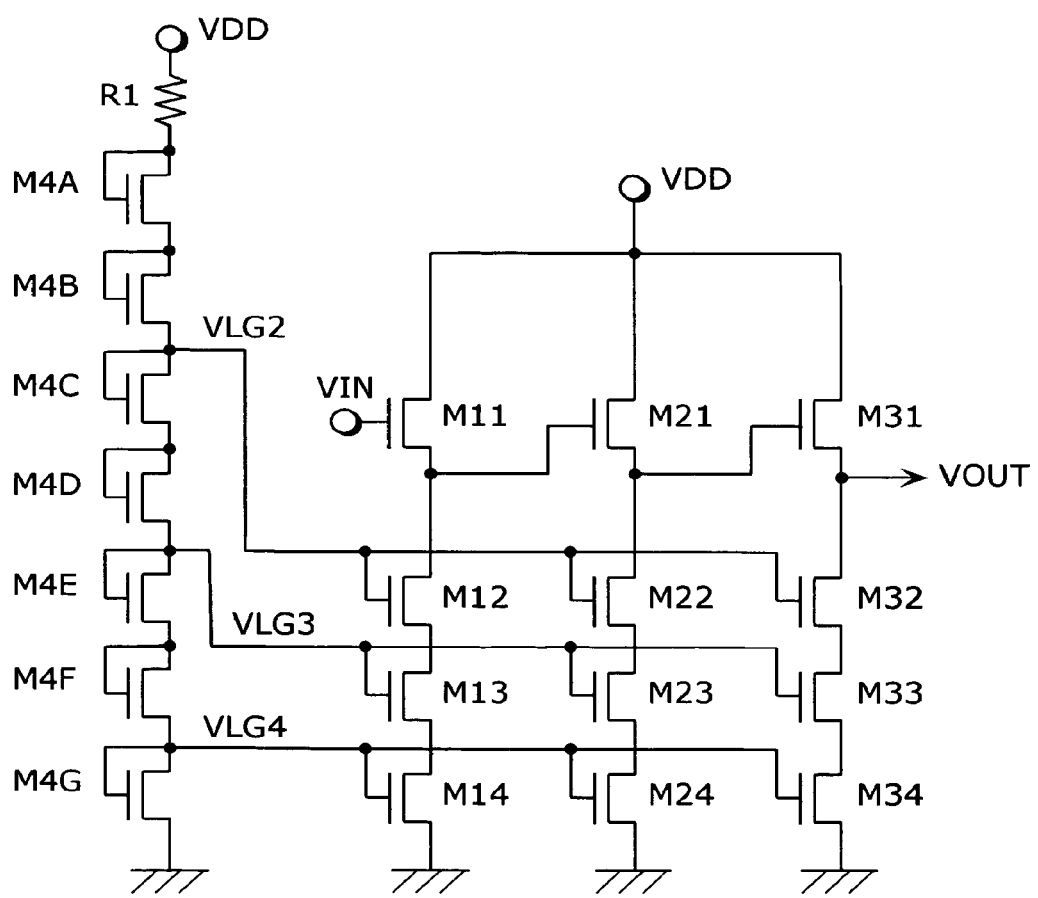
FIG. 11 is a circuit diagram of the output amplifier included in the solid-state imaging device in the eighth embodiment.

FIG. 11 is a circuit diagram of the output amplifier included in the solid-state imaging device in the eighth embodiment of the present invention. The difference with the sixth embodiment lies in the point where the gate and drain of M4C, instead of M4E, are connected to the gates of the transistors M12, M22, and M32, as well as in the point where the gate and drain of M4E, instead of M4F, are connected to the gates of the transistors M13, M23, and M33. From a different perspective, it can be said that in the eighth embodiment, M13, M23, M33, M25, M25, and M35 have been deleted from the seventh embodiment and the parts which served as the sources and drains of these deleted transistors have been connected. As a result, among the MOS transistor group M4A, M4B, M4C, M4D, M4E, M4F, and M4G which are serially connected along the current path regulating the reference current, there are four transistors, namely M4A, M4B, M4D, and M4F, which are not connected to another MOS transistor outside such serial connection. In addition, among the four, M4D is inserted between M4C and M4E which are connected to other transistors, and M4F is inserted between M4E and M4F which are connected to other transistors.

Likewise in the eighth embodiment, the MOS transistor group M4A, M4B, M4C, M4D, M4E, M4F, and M4G which are serially connected along a current path regulating the reference current, all bear the same structure, and when the power source voltage VDD is 12 volts, the voltage drop in the respective transistors is set at approximately 1.5V. Accordingly, the source potential of the transistors M12, M22, and M32 is set at approximately 6V, in the same manner as in FIG. 10. As a result, the source-drain voltage of M12, M22, and M32 is about 2 to 4V. In other words, in the eighth embodiment, it is possible to obtain the same hot-carrier preventing effect and the same imaging characteristic deterioration preventing effect as in the five-stage cascode current mirror circuit shown in the sixth embodiment, while using the same number of transistors as the three-stage cascode current mirror circuit shown in the sixth embodiment. The number of transistors needed to obtain the same imaging characteristic deterioration prevention effect can be reduced, and it is also possible to contribute to chip size reduction.

Figure 12:
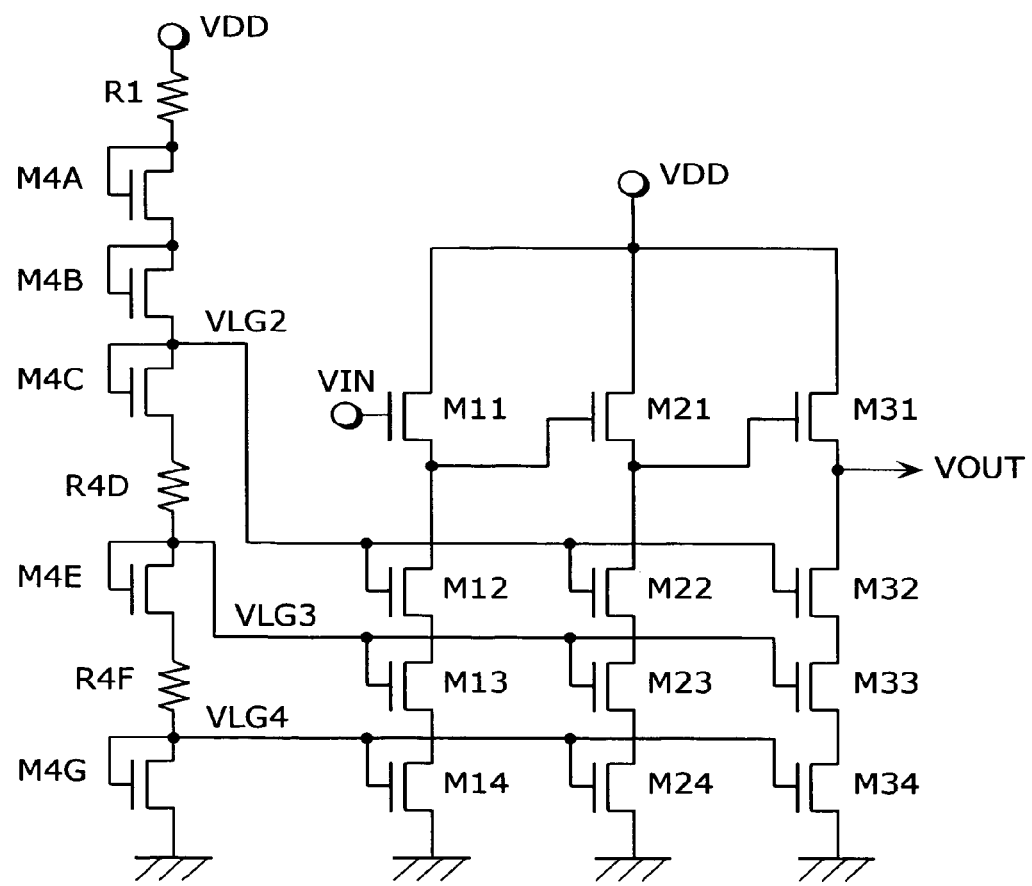
FIG. 12 is a circuit diagram of the output amplifier included in the solid-state imaging device in the ninth embodiment.

FIG. 12 is a circuit diagram of the output amplifier included in the solid-state imaging device in the ninth embodiment of the present invention. The difference with the eighth embodiment lies in the point in which the transistors M4D and M4F in the eighth embodiment are substituted with resistive elements R4D and R4F, respectively. By setting the values of the resistive elements R4D and R4F with the same values as that of the channel resistors M4D and M4F, it is possible to obtain approximately the same load conductance reduction effect, hot-carrier preventing effect, and imaging characteristic deterioration prevention effect, as in the eighth embodiment.

Figure 13:
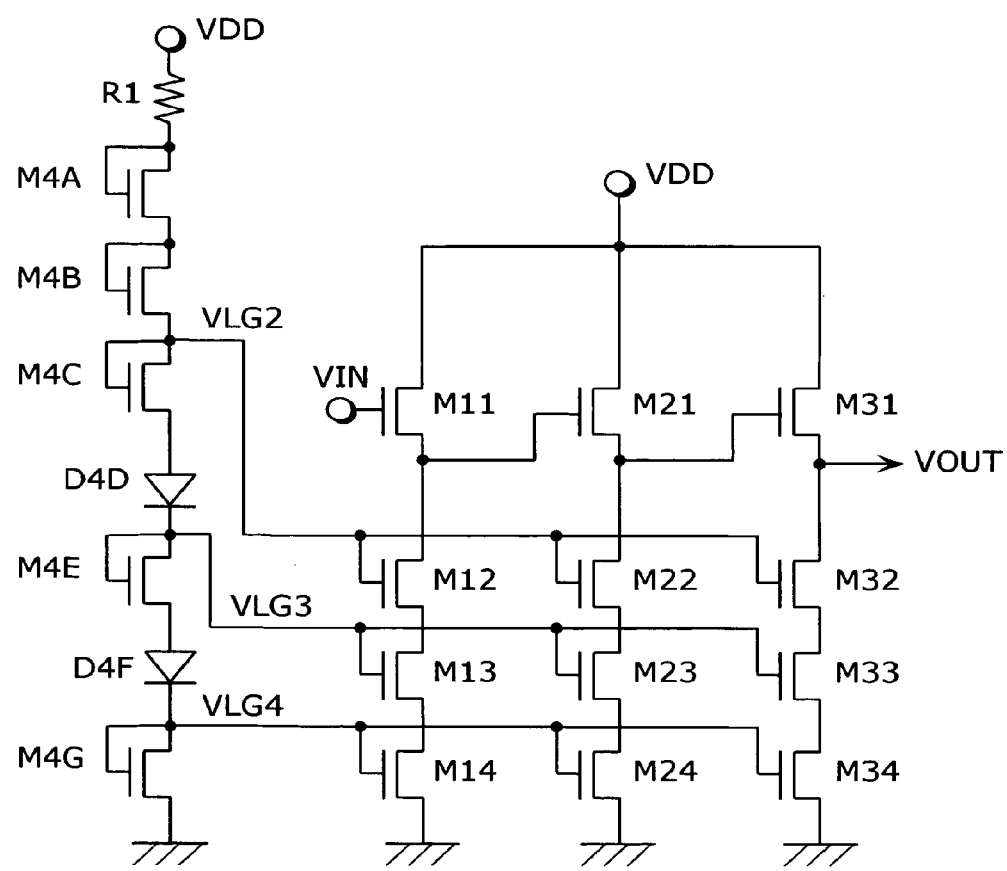
FIG. 13 is a circuit diagram of a variation of the output amplifier included in the solid-state imaging device in the ninth embodiment.

Furthermore, the resistive elements R4D and R4F can also be substituted with diode devices, and the like, from which the same voltage drop can be obtained. A sample circuit is shown in FIG. 13.

Moreover, the aforementioned current mirror circuit is not limited to a cascode current mirror circuit, and may also be a Wilson current mirror circuit, and the part along the current path connected to the driver transistor can be structured by a plurality of MOS transistors that are connected serially. With this, the conductance gl of the load circuit can be further restrained and gain can be improved. Furthermore, the solid-state imaging device according the present invention is not limited to a CCD-type solid-state imaging device, and is applicable in amplification-type solid-state imaging devices, and the like, such as the MOS-type, AMI-type, and so on.

Moreover, the camera according to the present embodiment includes the solid-state imaging device shown in the respective embodiments described previously, and has the same structure and operation, and produces the same effects.

Furthermore, the present invention, is suitable for a solid-state imaging device and camera having a source-follower amplifier, and is suitable for an image sensor, a digital camera, a camera-equipped mobile phone, a camera included in a notebook computer, a camera unit connected to an information processing device, and the like, for example.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A solid-state imaging device comprising:
   a source-follower amplifier having a driver transistor; and
   a load circuit which is connected to the driver transistor, said load circuit includes:
   a first metal-oxide semiconductor (MOS) transistor having a gate with a fixed potential; and
   a load device which is connected to a source of said first MOS transistor and includes a second MOS transistor,
   wherein the source of said first MOS transistor is connected to a drain of the second MOS transistor,
   the source of the first MOS transistor is connected to a gate and the drain of the second MOS transistor, and
   a channel width of the first MOS transistor and a channel width of the second MOS transistor are equal.

2. The solid-state imaging device according to claim 1, wherein said source-follower amplifier is included as part of a plurality of cascade-connected source-follower amplifiers arranged in stages.

3. The solid-state imaging device according to claim 1, wherein said load device includes a plurality of serially connected MOS transistors each of which has a drain and a source, the drain of one of the plurality of serially connected MOS transistors preceding in the serial connection being connected to the source of another of the plurality of serially connected MOS transistors immediately following in the serial connection,
each of the plurality of serially connected MOS transistors has a gate connected to the drain, the plurality of serially connected MOS transistors including the second MOS transistor, and
channel widths of the plurality of serially connected MOS transistors are equal.

4. The solid-state imaging device according to claim 1, wherein a gate length of a MOS transistor other than the first MOS transistor is greater than a gate length of the first MOS transistor.

5. The solid-state imaging device according to claim 1, wherein a threshold voltage of a MOS transistor other than the first MOS transistor is higher than a threshold voltage of the first MOS transistor.

6. The solid-state imaging device according to claim 1, wherein a gate dielectric film thickness of a MOS transistor other than the first MOS transistor is greater than a gate dielectric film thickness of the first MOS transistor.

7. The solid-state imaging device according to claim 1, wherein a gate length, a threshold voltage, and a gate dielectric film thickness of a MOS transistor other than the first MOS transistor are respectively equal to a gate length, a threshold voltage, and a gate dielectric film thickness of said first MOS transistor.

8. A camera comprising a solid-state imaging device, the solid-state imaging device comprising:
   a source-follower amplifier having a driver transistor; and
   a load circuit connected to the driver transistor, said load circuit includes:
   a first MOS transistor having a gate with a fixed potential; and
   a load device which is connected to a source of said first MOS transistor, and includes a second MOS transistor,
   wherein the source of said first MOS transistor is connected to a drain of the second MOS transistor,
   the source of first MOS transistor is connected to a gate and the drain of the second MOS transistor, and
   a channel width of the first MOS transistor and a channel width of the second MOS transistor are equal.

* * * * *